Dec. 1, 1959   X. L. BEAN   2,914,823
CASTING MOLD AND PATTERN AND PROCESS
Original Filed Dec. 4, 1950

INVENTOR:
BY Curtis, Morris & Safford
ATTORNEYS:

United States Patent Office 2,914,823
Patented Dec. 1, 1959

2,914,823

CASTING MOLD AND PATTERN AND PROCESS

Xarifa L. Bean, Yellow Springs, Ohio, assignor to Morris Bean & Company, Yellow Springs, Ohio, a corporation of Ohio Original application December 4, 1950, Serial No. 199,006, now Patent No. 2,836,867, dated June 3, 1958. Divided and this application August 16, 1956, Serial No. 610,432

5 Claims. (Cl. 22—126)

This invention relates to molds for the casting of molten materials, and more particularly to molds of highly refractory materials, such, for example, as silica sand, which are suitable for use in the production of smooth, accurate and sound castings of a wide variety of sizes and shapes, of iron, bronze and other relatively high melting alloys.

A mold for precision casting, especially one suitable for the precision casting of ferrous and other high melting alloys, must not only be refractory enough to withstand the pouring temperature of the metal but must present such a smooth surface as to give the desired surface to the metal as cast. The surface of the mold must also be sufficiently permeable and with a sufficiently permeable backing to support the metal at the desired surface but to provide for the ready escape of gases and vapors. Obviously such a mold should be relatively cheap, as to labor, material and equipment costs; also it should be easy to remove after the casting has cooled or set.

It is therefore one object of the invention to provide improved molds for casting of metals. It is an object to provide a high degree of accuracy, high strength and rigidity in the mold. It is also an object to provide in a refractory casting mold, for casting high temperature metals such as ferrous alloys and bronzes, a surface as smooth and true as that produced by plaster molds with low temperature metals.

In general the invention aims to provide molds (and cores, which are here considered a type of mold) particularly of highly refractory materials, which are suitable for the production of castings of all sizes (as distinguished from the necessarily small castings made by "investment molding" over wax or plastic patterns), in a wide variety of metals, and particularly precision castings of ferrous and other high melting alloys.

Other objects and the manner in which the objects are achieved will appear from the following description and claims.

To this end, the invention relates to an improved mold of desired properties and dimensions and to a refractory mold material, such as quartz sand of suitable degrees of fineness, and with strength, permeability and surface character modified by use of a binder; and, if desired, of surfacing materials.

The invention also relates to molds and materials for molds such that uniformly successful results can be obtained, on molds of a wide variety of size and design, under commercially practical and economical processing conditions.

In the manufacture of such molds, inventions of my parent application Serial No. 199,006, filed December 4, 1950, may be used to advantage. For example, in the preferred utilization of the invention the pattern over which the mold is to be formed is made of a material which initially has sufficient rigidity to hold its form, surface character and dimensions with high fidelity at room temperature and under necessary conditions of handling in foundry practice and under the heat to which the mold material must be subjected for setting the binder and until the mold has become self-sustaining. The preferred pattern material is also of such a nature that it is gradually transformed by the same treatment which sets up the bond in the mold material so that at the end of the binder-setting treatment, the pattern material will have been disintegrated, or its disintegration initiated, e.g., by the binder becoming fragile or friable (or sensitive to water or air or other readily available material) so that it can readily be disintegrated and removed from the mold.

It has been found as set forth in my copending application Serial No. 199,006, filed December 4, 1950 that a suitable pattern material for the purposes aforesaid is a plaster composition comprising a substantial portion (e.g. 20%–100% calcium sulfate) with or without filler. The material used and the method of forming it into any desired shape, as described in U.S. Letters Patent to Morris Bean, No. 2,220,703, granted November 5, 1940, have been found suitable for this purpose, and dimension stabilizing agents may be used, e.g. those set forth in my Patent No. 2,391,855 and application Serial No. 125,645, filed November 4, 1949, now Patent No. 2,531,496; but the recrystallization treatments are not necessary. The use of such plasters, which give strengths on initial set of 50–200 p.s.i., allows for ordinary compounding with fillers such, for example, as sand, talc, re-used plaster, terra alba, etc. (which, as is well known, reduce the set strength) and still leaves adequate strength to the set plaster for prompt removal from the pattern mold and for the necessary handling in ordinary foundry practice without damage to the pattern such as would destroy its accuracy of detail in reproducing the molding surface. The plaster of Paris composition thus used may preferably be one which contains not less than 15% nor more than 90% of plaster of Paris (calcined gypsum powder) mixed with some finely divided or granular refractory material such as fibrous or foliated talc, asbestos, etc. Fine granule material as, for exmaple, silica, may be used instead of, or in addition to, such fibrous or foliated material, but impalpable powdery materials like clays, and even dusts which may occur and need to be separated from asbestos or talc, are likely to impair desired physical properties. Fibrous materials, if used, should be of short fiber length.

It is advantageous to use enough water in the plaster mix to give it fluidity such that it readily flows into conformity with the fine detail of the pattern mold, but more water in the mix can be undesirable. I can also use a stiffer plastic composition with only enough water to make it moldable, and in some cases it is desirable to use plaster of Paris with no other solid ingredients. The use of resilient flexible materials for the pattern molds, such as the elastic vinyl polymer gels as set forth in said Bean Patent No. 2,220,703, or synthetic rubber thermal setting compounds, is of important advantage.

More specifically, calcium sulfate molding plasters have the following advantages for the purposes aforesaid:

(1) Ease of forming (as a liquid slurry).
(2) Rapidity of set (4 to 7 mniutes).
(3) High green strength (50 to 200 p.s.i.), so that they can be drawn without damage off flexible patterns with undercuts.
(4) Good accuracy (plus or minus .0001" to .0005" per inch deviation when cast over a master pattern).
(5) Good dimensional stability, especially when mixed with a filler such as sand, at somewhat elevated temperatures (to 400 degrees F.).
(6) A porous structure that contains free water, or can be made to contain other fluids as a means of achieving the desired results. Also a structure which will permit the introduction by driving or other simple means, of certain metallic blades, pins or other inserts later to be incorporated as a part of the final casting.

(7) Very easy wastability, especially if dehydrated by a sufficient heating process. It has been found that if a calcium sulfate bonded pattern or pattern mold is heated, especially to the soluble anhydrite condition, it is easily wasted, either by an air jet (generally the preferred method) or by water. If sufficiently dehydrated, plaster is immersed in water it is quickly transformed to a wet mass having the consistency of a loose mud, which is easily washed away, even by tap water, though increased water pressures increase the speed of removal. (If set gypsum plaster which is not dehydrated is immersed in water, it is not affected, and will maintain nearly its normal set strength for several days.)

The next step in making molds using materials of the present invention is dependent somewhat upon the character of the material employed to coat the pattern. In the preparation of a mold for greatest smoothness of surface and minuteness and accuracy of detail, three factors are important:

(1) The particles on the surface must be of sufficient smallness of size to give the surface quality desired.

(2) All particles must be packed closely together.

(3) Each particle of the mold must be bonded sufficiently well to its neighbors so that pattern removal will not dislodge it.

The extent to which conditions 2 and 3 are met determines the quality of result which can be obtained with particles which are small, but still of such character that a mold body, if made out of these same particles, will have good permeability to gases. It is surprising the surface quality which can be obtained, for example, by perfect packing and bonding of that fraction of a washed round grained sand, such as an Ottawa sand, which will pass through a 100 mesh screen. Ordinarily the "green bond" which has to be relied upon in conventionally drawing a sand mold from a pattern is not sufficiently strong so that those grains which are packed into sharp corners or minute detail can be removed with the mold, so that though surfaces may be fairly smooth, sharp corners will have lost their true sharpness. As has been explained, the bond which holds the sand grains together is very strong, especially when it has been fully developed by a heating process, before the pattern is removed, and the pattern has been weakened to such an extent that removal is very easy and cannot damage the set mold.

In order to get perfect packing, it is desirable that the sand be dry, so that it will flow like a fluid, and that it be made to occupy the minimum possible volume, as by vibrating the pattern which holds it. In order to get perfect bonding, it is necessary that the bonding agent be present and effective (especially strong enough to resist damage in pattern removal) at the points of contact of the sand grains. By proper selection of sand, binder, and method of distribution of binder, it is possible by forming it, according to the present invention, against a disposable pattern such as that described below, to make a mold with a single kind of sand which will have surface smoothness, accuracy and castability (permeability and refractoriness) so that the casting obtained therein has the required properties as cast. For example, it has been possible and practical to make castings of gray iron for tire molds by this method which meet the exacting requirements of the trade.

The best binders for the purposes herein described are of the class known as thermo-setting resins which are adhesives to sand. Several phenolic type resins have already come into use for the bonding of sand in foundry molds, and we have found these very satisfactory for the present invention. However, other drying or settable binders, whether set by heat or by catalyst, can be used in the invention.

The effectiveness of a binder in this invention is not only a matter of its adhesiveness and strength, but also of its distribution. It is so difficult to obtain, and particularly to maintain, satisfactory binder distribution for the exacting requirements of castings of unusual quality that I have found it desirable, in utilizing this invention, to make a separate step of binder distribution which makes possible (1) complete distribution and continuous coating of each grain of sand, (2) a dry, free-flowing sand, easily distributed and closely and uniformly packed over a pattern, and capable of developing a strong bond at every point of contact of sand grains with each other.

One very satisfactory method of distributing the binder is by means of a volatile solvent. The sand, binder and solvent are mixed together and mixing is continued until the sand is coated with a lacquer-like coating of resin, and the coated sand is again dry and free flowing. Good materials to use, for example, are a phenol formaldehyde resin such as the Bakelite Division of Union Carbide & Carbon Corporation's BR15401, or BR18554 or BR18478, and a volatile solvent such as acetone, methyl ethyl ketone, alcohol, etc. In general, from 1% to 4% by weight of binder is used and from 1% to 4% of solvent. One very satisfactory formula is 100 kg. of screened Ottawa sand, 2 kg. BR18478, and 3000 cc. acetone. A conventional sand muller works very well for the mixing operation.

Sand thus coated will bond perfectly, even if heated in the presence of a large, wet disposable pattern. If the resin is distributed in finely divided form by conventional means e.g., by means of the use of a diluent (whether as a powder or with the resin suspended in water or other non-solvent liquid, or as the commercial "liquid binder") it is likely to be subject to migration into the wastable pattern, so as to seriously interfere with the separation from the mold, or to sintering without bonding, and not to remain effectively distributed.

For the proper distribution of binder it is very important to use an amount of the resin which can be distributed over the surfaces of the granular material and be held thereto without sifting or draining through the mass. Thus one may realize the uniform, high quality results of this invention. It is important also for securing the most effective use per unit cost of binder.

Although it is possible to make a smooth, accurate mold out of a single kind of sand, such as described, it is frequently more satisfactory to use a fine sand for a facing layer, and a coarser sand for a back up. This is done by taking a fine fraction of the coated sand (through a 140 or through a 200 mesh screen, for example) and pouring it over the damp disposable pattern. The fine particles will stick as a very thin layer to the damp surface of the disposable pattern, and the balance can be poured out. A 70 or a 50 mesh sand can then be poured in, the whole mass vibrated, and a very satisfactory total result obtained. This procedure puts the fine sand on the surface of the mold, where it is needed for smoothness, sharpness, and reproduction of detail, and permits the use of a more permeable backing.

A very good result can be obtained by using a disposable plaster-bonded pattern just as it is made, without any further preparation. However, if desired, it can be dampened or saturated with (e.g. by dipping in) a non-solvent liquid such as water, oil, or kerosene, or otherwise treated so that temporary adhesion of every particle of the fine sand layer is assured for smoothness and accuracy of surface reproduction. No difficulty is experienced in separating the finished, baked mold from the disposable pattern when a coated facing sand is used as described, as there is no opportunity for the resin to penetrate the surface of the disposable pattern in any way.

By the means just described, as fine and as refractory a surfacing layer as desired can be made, and also as permeable a mold body as is necessary for the conditions of casting.

The mold is made to any desired depth and dimensions. It has been found desirable, in general, to make molds of sufficient thickness, so that distortion due to bending during casting will not occur. Differential thermal expansion (between the side next to the metal and the side furthest removed) may cause mold distortions (which are reflected in the casting) greater than can be tolerated in castings which must meet high standards of accuracy. It has been found that any strongly bonded sand, such as conventional core sand, will distort amounts which are prohibitive for accurate work, unless corrective measures are used. This is a distortion similar to that which occurs in a slab of any material when it is suddenly heated on one side while the other remains cool. The addition to the sand mix of materials such as wood flour, or the incorporation in the mold of properly designed and placed steel reinforcings, will reduce the tendency to distort, but these methods are usually not as effective as increasing the mold depth or thickness to a point where the thermal stresses cannot induce bending.

The accuracy of molds made as here described is very great, even in cases where there is a volume change (e.g. shrinkage) in the total mass of sand.

It has also been found that the presence of other binders, such as urea formaldehyde resins, or hydrosetting cements, which first bond the sand at a lower temperature than the phenol formaldehyde binders, will set the mass a constant volume before any shrinkage occurs, and accuracy, not only of surfaces supported or contacted by the wastable pattern, but of the whole volume of sand, will be the result. Such auxiliary binders are not necessary; and whether one is used will depend largely upon special requirements of the mold and casting to be made. Other thermo-setting binders and also low temperature setting binders may be used in lieu of the phenol-formaldehyde resins, but my experience has shown that advantage is gained by use of the type of resin specified above.

It is an important characteristic of this combination described that the sand mold is bonded so as to have its form fixed before any serious dimensional changes occur in the plaster pattern. When, at higher temperatures, such dimensional changes may tend to occur in the plaster, the mold is already stronger than the pattern.

An alternative method to the one here described for obtaining a smooth, accurate mold surface against the disposable pattern is to make a liquid slurry of a fine refractory and binder. A most satisfactory slurry consists of finely divided silica sand, or silica sand and clay, a combination of dry powder and liquid phenolic binders in about equal amounts, and a liquid vehicle. It has been found that again the problem of resin distribution is very important, and that a water vehicle and a combination of the two commercial forms of phenolic binder give the most practical results. The combination binder, of both dry and liquid forms, will bond the fine facing sand much more effectively in the presence of a large, wet, disposable pattern, than either used alone. Another satisfactory method of making a slurry is to coat the fine refractory particles with solvent and dry resin as described above, and then add the water or other liquid vehicle. Since the dry resin is insoluble in water or other suitable liquid vehicle, it will remain effectively coated on the refractory particles in the presence of the vehicle, and during the curing operation.

If a wet slurry is used, it is usually necessary to apply a separating layer to the disposable pattern before the mold is made. Otherwise adhesion may occur between the disposable pattern and the cured sand mold and it is very difficult to remove the pattern from the finished mold except by disintegrating it with water and washing it off. Though good results can be obtained in this way, it is often awkward and messy, especially on large work, to disintegrate with water and requires separation of the plaster from the water in settling basins or tanks and redrying of the mold before casting.

A suitable parting is a solution of commercial flexible collodion in acetone, which is applied as a spray to the surface of the disposable pattern. Before the spray is applied, the disposable pattern is saturated with water so that the collodion solution cannot penetrate it, and in itself prevent the effective separation of the mold from the pattern. The collodion makes an excellent (continuous and extremely thin) separating film, and the finished mold when set can easily be freed from the disposable pattern by means of an air blast. The collodion film adheres to the binder in the slurry coat and is thus transferred to the mold in the baking step (the temperature of the baking in such case being kept below that at which the collodion coat would be destroyed) and thus it serves to protect the surface during the cleaning and subsequent handling of the mold. It is quickly burned off in the casting step with no difficulty in the casting process or damage to the final casting.

Smooth films of refractory powders, especially of pigment grade, such as graphite, red iron oxide, aluminum, alumina, etc. can be used to form separating layers also, and frequently with important advantages, but means have to be provided to hold them in place on the surface of the disposable pattern so that the slurry does not dislodge or lift them. These are best applied as dry powder while the surface of the pattern is moist with water or other liquid which will hold a very thin layer and allow any localized excess to be redistributed by blowing or light brushing. A spray of potash soap or other soap applied over the pigment is an effective means of doing this. The calcium soap produced where the soap solution meets the calcium plaster forms an insoluble film by which the powder is held, so that, during application of the slurry coat, the powder is held in place to perform its function as a separating layer. In the baking step, the refractory powder will become bonded to the mold surface by the bonding agent in the slurry, and will form the outermost surface layer of the finished mold, and most faithfully reproduce the sharpness and detail thereof. In cases where special surfacing layers are desired on molds, by reason of chemical, physical, economic or other factors encountered in making castings, this is an excellent method of achieving the desired result easily and effectively, and especially without loss of surface detail or accuracy.

The slurry coat is preferably sprayed against the waste mold, so as to avoid trapping of air, although it can be poured over the waste mold and promptly poured out so that just a thin layer remains, if it is convenient to take the precautions necessary to avoid trapping of air, or in forms of molds such that that is no problem.

Following the application of the slurry coat, which as above pointed out is made with a very fine sand, or other refractory so that the face of the mold that forms the casting will be smooth and will reproduce accurately the finer detail of the pattern, a rigid backing is formed thereon, and this backing is made more permeable than the facing. The backing material may be introduced as a dry mixture of sand and binder, preferably a coated sand such as has been described, and which has the advantage of flowing freely and uniformly into all corners and making a completely continuous support for the slurry coat; or it may be as a wet mixture, which has the advantage of having some green strength and ability to remain packed in position without the benefit of complete external flasks or other support. The wet material is not as easy to distribute and pack uniformly as the dry material. The design and requirements of the mold will determine which type of backing is selected.

For a good bond between the slurry coat and the back-up, it is advantageous that the slurry coat be wet (not air dried or robbed of water by the wicking action of the disposable pattern) when the backing is applied. This permits individual grains of back-up sand to bed themselves in the slurry coat, which seems to be important if the best bond is to be developed. As noted previously, it is an advantage for the mold to be made thick or heavy if distortions due to bending in casting are to be avoided.

The desired mold having been built up in the manner hereinabove described, the mold and pattern assembly is now ready for the baking operation which is done at a temperature and time sufficient to set the resin binder. When the thermo-setting binders employed are the phenolic resins hereinabove suggested, the baking may be carried out satisfactorily at a temperature within the range of 400° F. to 475° F. The length of time required for the complete setting of the resin, varying somewhat with the size of the mold and running usually anywhere from 3 to 12 hours. In general it is advantageous to bake the molds at a temperature which will not overcure part of the mold so long as other portions slower to heat up are not yet sufficiently baked.

It will be seen that, because of the water in the pattern, the temperature of the pattern and of the mold will not immediately be raised to the resin-setting temperature for setting the phenolic type resin; and that as a matter of fact the temperature will not increase much above the boiling point of water or other saturant in the pattern until the pattern is dry and at least partially dehydrated. It is this fact which makes it so important as explained previously that special means be provided for obtaining and maintaining effective distribution of the resin, so that it cannot migrate under conditions of slowly rising temperature, or sinter without bonding; and as an alternative, makes desirable the use of resins which set at lower temperatures and/or in the presence of water vapor. It is ordinarily desirable to evaporate the water as quickly and uniformly as possible, and therefore good circulation of dry air should be maintained in the oven.

After the pattern is dried the temperature rises above that at which the bonding resin is set or cured and above that at which the disintegration of the pattern is initiated—in the case of plaster patterns by dehydration of the calcium sulfate. It will be seen that in the preferred operation, the dehydration of the plaster pattern takes place as a result of the heating used for setting the resin, and this dehydration makes the pattern relatively weak and disposable, and as the calcium sulfate has been converted into soluble anhydrite, it is in condition which can easily be further weakened by soaking with water. The pattern is thus easily removed from the now set and self-sustaining mold e.g., by being broken away and by the use of a jet of compressed air to lift out any portions which remain embedded in mold recesses. Although the air blast method of cleaning the residual pattern material out of the molds is preferred, since this leaves the mold ready for immediate use after its removal from the pattern, it is also possible to effect removal of the pattern by soaking the mold and pattern in water and using a water jet to remove pattern particles from the deep recesses of the mold, but in such case removal must be completed promptly because the plaster will re-set before long, after it has been wet. Another advantage of the air jet method is that it permits use of mold compositions which would be deteriorated by water. Thus in some cases one may advantageously use bentonite, cereals, or water soluble or swellable binders, especially in the backing layer, applied before or after the final treatment of the mold face and this could only be practicable if the removal is done without the use of water.

When the casting to be made is such as requires inserts, as for example machined threads, sheet metal parts or wire, etc., to form narrow projections from the mass of the casting, this can be done according to my invention by driving these into the plaster pattern in the appropriate locations and depths, or by placing them in the molding pattern and casting plaster around them, with the desired portions projecting for anchoring in the casting mold. In this manner, for example, we have successfully cast tire molds with inserts of 18-8 stainless steel strips for making non-skid divisions in the tire tread, although that had previously been found impossible in cast iron molds due to a change in the steel from Austenitic to Martensitic.

From the foregoing description of the invention it will be seen that the practice of the novel process of making molds for precision casting of metals, and particularly for the precision casting of ferrous and other high melting alloys, which has been described hereinabove results in the production of an accurate smooth mold which does not depend at all for its smoothness on a wash, dip or other surface smoothing treatment, but reproduces with high fidelity the surface of the original. Moreover, such a mold can be made with any desired permeability, over 10 and advantageously from 50 to 200 as measured on a standard A.F.A. test piece in accordance with the standards set up by the American Foundryman's Association. It will further be seen that by the present invention it is possible to make a one-piece mold using a disposable pattern, as hereinabove described, notwithstanding undercuts such that, if a rigid permanent pattern were used, it could not be withdrawn therefrom.

An important feature of the invention when practiced as hereinabove described is that, although the mold, as it is built up on the pattern, has substantially no strength until the bonding resin is set, the pattern employed is initially strong at room temperature and maintains its form and dimensional stability during the binder setting operation and until the mold has acquired sufficient strength to hold its form and dimensions; whereas the pattern loses its strength so that it can be readily disintegrated or broken away from the mold after the mold has thus gained its strength.

The mold produced by the process hereinabove described, that is the mold that is obtained after the baking operation and after removal of the disposable pattern, may, if it is desirable, be combined with other parts or incorporated as part of a larger mold before casting. It may be used in combination with green sand mold parts, conventional baked sand cores, chills, inserts or other foundry mold materials within the skill of the foundryman.

When the mold is used for casting high melting alloys, for example those which are cast above a temperature of 1200° C., the heat will cause disintegration of the binder. In other words, the binder will be charred to carbon and may be substantially oxidized, but not before the metal has set to the shape of the mold. This burning of the binder makes the mold very easy to remove from the finished casting, and thus adds to the economy of the process.

Although we find it highly advantageous to use plaster patterns according to this invention, other aspects of my invention can be more broadly applied. For example, we can use my invention in a modification of the "lost wax" process, wherein the pattern is made of any material which is readily formed to the pattern shape and which is:

(1) Disintegrated by conversion to a pourable liquid or vapor at a temperature above the setting temperature of the thermo-setting bonding resin in the mold, so that it can hold its form and surface until the mold material is set up and thereafter can be poured out through the mold gating or drained off through the porosity of the mold;

(2) When melted, flows freely off from the mold surface so that any residual film does not clog the permeability of the mold;

(3) Can be repeatedly remelted and reformed or is cheap enough to waste.

(4) Does not dissolve or chemically attack the bonding material in the mold.

(5) Any residue retained on the mold does not objectionably attack the molten metal, or other material which is to be cast into the mold;

(6) Is safe to use under plant conditions.

Higher melting point waxes (particularly the higher wax-like paraffins or so-called petroleum waxes) can thus be used in a "lost-wax" process using all of the mold making and metal casting features of my invention; and likewise patterns may be die-cast with die-casting alloys e.g. of tin with lead and/or copper and antimony. Such alloys are available which melt at various temperatures from 380° F. up, so that one may be selected which melts a little above the curing temperature for setting up of the particular bonding resin being used. Thus, in the baking of the mold, it is first brought to setting temperature and after the mold is heated through and the bond has set, the temperature of the pattern is raised above its melting point and the molten alloy is poured out. We have also found that if the slurry coat and/or moist sand mixture with the bonding resin is molded on a wax pattern and then allowed to dry, particularly if the mixture contains a solvent for the resin, which does not dissolve the wax, the resulting mold will hold its form during careful heating even after the wax is softened and fuses, and that a good mold can be obtained in this way.

Although I give below a specific example and show the same in accompanying drawings, and although I have given various specific preferences, recommendations and alternatives, it is to be understood that these are not exhaustive or limiting of my invention but are illustrative and for the purpose of instructing others in the principles of the invention and how to modify it so that they may be able to use it in a variety of embodiments each best suited to the conditions and requirements of a particular use.

*Example 1*

Figure 1:
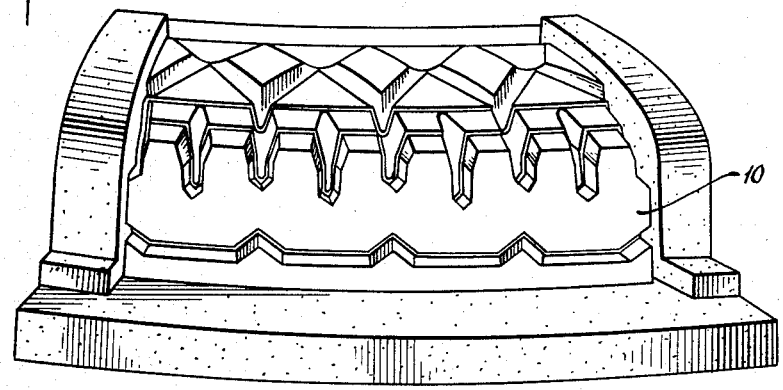
Figure 1 shows a flexible resilient pattern mold ready for molding a disposable pattern therein.
Figure 2:
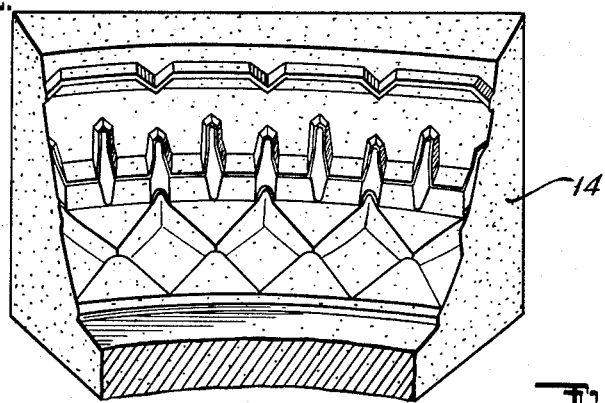
Figure 2 shows the pattern made from the molding pattern mold in Figure 1 inverted and ready for the application of the mold material thereon.
Figure 3:
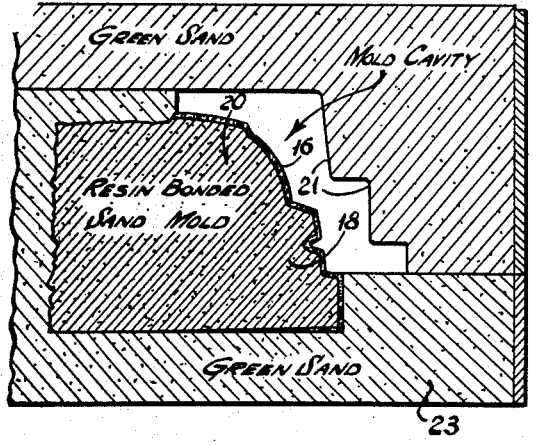
Figure 3 is a view in vertical section of a mold built up thereon after baking and removal from the pattern and assembly in a green sand investment.
Figure 4:
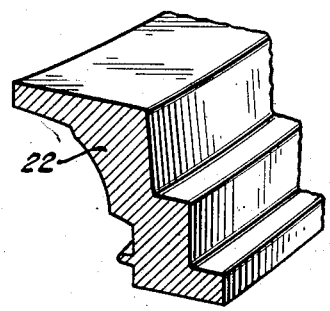
Figure 4 is a view in vertical section of the metal casting made in the mold of Figure 3.

As illustrating the practical utilization of the invention, I have shown the making of a steel mold for molding rubber or plastic (specifically shown as a tire mold). A suitable flexible resilient plastic is molded over the article or model (in this case a mold for rubber tires) to be reproduced, to produce an accurate negative impression 10 of its surface. (In the case of a mold for plastic articles, as illustrated, this model will ordinarily be a negative of the plastic article made, for example, by casting plaster onto such article or an artist's model of it.) For this pattern mold, an elastic gel of vinyl chloride and a suitable plasticizer such as tri-cresyl phosphate has been found satisfactory. This pattern mold may also be made of a synthetic rubber, especially one of the class which is caused to vulcanize at room temperature by means of chemical accelerators. It has been found by experience that these synthetic rubbers have the advantage over the vinyl gel that they can be formed to greater dimensional accuracy and retain their dimensional stability over longer periods of time. Using the vinyl gels for example, the operation of making them is as described in the patents of Morris Bean Nos. 2,435,643, 2,404,528 and 2,349,806 excepting, of course, that here we make a negative pattern mold 10 (i.e., a negative impression with respect to the metal casting to be made) instead of a conventional pattern, which is generally a positive with respect to the metal casting.

The pattern mold 10 thus made can be used over and over, and plaster composition wastable patterns 14 taken off it in rapid succession, with negligible deterioration of the pattern mold from extended use.

The next step is to pour a plaster slurry into this pattern mold to make a positive pattern 14. This slurry may advantageously be made of a base composition containing 40 parts of molding plaster, 50 parts of Ottawa sand approximately 50 mesh in size ("Bond Sand") and 10 parts of talc. If desired approximately ½ part each of sodium silicate and Portland cement may be added to increase the dimensional accuracy of the set composition. Also ½ to 2 parts of terra alba (calcium sulfate dihydrate in a finely divided powder form) may be added as an accelerator to bring the setting time into the 4 to 7 minute range which is so important to the economical commercial use of the pattern mold. The composition is made into a liquid slurry by the addition of approximately 54 parts of water to 100 parts of the plaster composition.

This slurry is poured over the pattern mold, which contains it until it sets. When the plaster in the composition has set, the disposable pattern is removed from the pattern mold, intact with an accurate impression of its surface. (The surface is formed entirely by the fine plaster and talc particles in the slurry, and the quality of the surface is not impaired by the presence of the sand grains in the mixture. The sand is added because it is a cheap filler, and also because its presence aids materially in easy disintegration in the disposal step.) The disposable pattern is now ready to be used in the further step of mold making.

The pattern is, in the preferred method of mold making, immediately covered with fine silica the individual grains of which have been coated with a dry, lacquer-like coating of phenol-formaldehyde resin binder BR18478. The coated particles are selected for size so as to give the desired surface smoothness, e.g., a silica sand in the range of particle sizes which pass through a 100 mesh screen and are held on a 250 mesh screen, and advantageously in the range 150 to 250 mesh. A uniform, thin layer 16 of these fine, coated particles will be held to the disposable pattern by the water on its damp surface. The surplus, which does not stick, is then poured out. The thickness of this surface layer of fine coated sand is to be determined by permeability—the gas-level-during-pouring balance. The entire body of the mold can be made of sand fine enough to give a smooth surface with sharp definition, provided the interstices between grains are not filled by finer particles which "plug" them up. When a particle size too small for the desired permeability of the whole mold body is chosen for the surface covering, its thickness will ordinarily be kept at ⅛ inch or less. If surface cracks or low surface permeability develop on baking, the thickness of the covering should be reduced.

The pattern is next covered by a body 18 of any desired amount of similarly coated Ottawa Bond Sand or Ottawa Banding Sand, selected on the basis of its permeability, volume change on heating, and cost in accordance with the requirements of the work to be done. The pattern and sand are then vibrated together by suitable means to effect maximum packing of the sand.

The full screen analysis of a Bond Sand which we use is as follows:

| | Percent |
|---|---|
| On 40 | 1.0 |
| Thru 40, on 50 | 29.5 |
| Thru 50, on 80 | 55.5 |
| Thru 80, on 100 | 8.4 |
| Thru 100, on 200 | 5.3 |
| Thru 200 | .3 |

More specifically, the sands are prepared as follows: 150 to 250 mesh silica particles are mixed with 3% of dry powdered phenolic resin grade BR18478. 3 liters of acetone per 100 kg. of sand is introduced and mixing is continued until all of the acetone is evaporated. If desired the resin can be dissolved in the acetone before mixing and the solution mixed with the sand as above, but in a single step.

Ottawa Bond Sand or Ottawa Banding Sand is prepared in a like manner for the principal body of the mold.

Another method is to take or make a single sand having the range and percentage of particle sizes desired for the two sands, coat them simultaneously and then sieve or otherwise separate out the desired fractions. This method assures that the final coated particles, especially for the surface coat, are of the desired particle size.

The disposable pattern 14 and the mold material 16, 18 applied thereon as described above is next put into an oven and baked in an atmosphere held at about 425° F. for 3 to 12 hours with good circulation maintained in the atmosphere of the oven.

At the end of this time, as soon as it is cooled (or before it is cooled if desired) the mold 20 with its pattern 14 is ready for pattern removal. The pattern is therefore broken with a light hammer into as many pieces as necessary to effect convenient removal, and any remaining portions lifted or disintegrated by a jet of air.

When the plaster pattern material is all removed, it will be found that the particles of sand in the mold are individually secured in that no surface detail has been lost or in any way disturbed by the removal step, and that the surface to be reproduced in metal has been most accurately and faithfully reproduced.

A sand mold is prepared in the usual manner, in an ordinary flask and with a standard pattern to form the rough back 21 of the mold cavity for the metal casting 22, which in this case is an iron mold for rubber tires, in which only the face needs to have a true surface. If the back of the casting is desired to be smooth and accurate, the back of the mold also will be formed according to the invention.

The baked molds made as above described from the resin bonded sand are then carefully positioned (by means of indexing or other locating means) and are invested with green sand or other refractory material. In designing the final mold, it is gated and vented in accordance with known principles and skill of standard foundry practice and thereupon is ready for pouring the molten metal.

The casting of the metal is done at a temperature which will permit entry of the metal into all parts and recesses of the mold, but which will also permit quick solidification of the metal after this has been accomplished. The pouring temperature should be sufficiently high to burn out the resin bond to a considerable depth, advantageously one to two inches, although a fraction of an inch is sufficient for successful removal of the mold in many cases.

After the metal has solidified and cooled, the mold sand is broken away and blown off with air pressure, and the surface of the casting will be found to be a substantially perfect reproduction of the pattern. Since a mold thus made is substantially pure silica and a combustible binder, there is no burning on of mold particles to the surface of the casting (such as frequently occurs with more conventional types of molds for high melting alloys) and no blasting with sand or other drastic cleaning method is necessary to get the casting surface perfectly clean.

This example may be modified in various ways:

Other refractories may be used beside silica, especially for the surfacing layer.

The disposable pattern may be dipped for a few seconds in kerosene, and drained until there is no surplus of kerosene on the mold surface, just prior to the application of the dry, coated fines of the surfacing layer. This treatment will aid in the adhesion of said fines to said disposable pattern surface.

More or less binder (than 3%) may be used, depending on the conditions of the part being made. In general, the binder percentage will range between ½% and 5%. The resin coating on individual grains of sand should be of the order of .0001" to .001", or stated in another way the volume of resin in the coatings, uniformly distributed over the grain surfaces, should be between .1% and 5% of the intersticial volume of the sand without the coating.

A single, carefully selected fine sand may be used for the whole mold, instead of a surfacing layer and a back up layer.

The disposable pattern may be removed by an immersion in water and a washing process rather than by the means described. The mold is then redried to prepare it for casting.

Other binders may be substituted for BR18478, such as a natural wood resin, or other suitable settable binder material.

Auxiliary binders, selected for their ability to maintain a constant volume in the sand mass during curing, may be introduced, e.g. urea formaldehyde binders. These should be such fine powder or such thin suspension or solution that they bond in the crevices between adjacent particles without holding the particles apart. Such auxiliary binder may be used by moistening the sand and then dusting with powder of the auxiliary binder, or by wetting the sand with a slurry of the binder. Setting will be by exposure to water, heating or other method depending on the binder selected.

Other materials may be introduced for the purpose of building certain necessary or desired foundry properties into the mold; e.g. wood flour for the purpose of reducing bending due to induced thermal stresses during pouring.

Other methods of curing the resin may be used; e.g., the disposable pattern may be dried, so as to remove all the free water, but not so as to dehydrate it or change its dimensions, the mold surface sprayed with oil, kerosene, or other material which will cause the dry, coated fines to adhere to the surface, the mold otherwise made as described, and the resin cured by dielectric baking, which has been found by the foundry industry to be a very successful method of curing resins of the type we prefer to use in a matter of a few minutes. This method has the advantage of a very quick and uniform cure, and very close process control. Or one may use a water-setting resin such as urea-formaldehyde of the so-called synthetic resin powder glues, preferably dissolving in an organic solvent and lacquering the sand grains therewith as above described, applying the dry grains to the pattern as before and then exposing the laquered sand body to water either by diffusion from the wet pattern or a slurry thereon, or by treatment with saturated steam.

Instead of the fresh plaster used in the composition for the disposable pattern, second settle plaster can be used, or waste molds can be crushed and sifted and used, advantageously with a portion of fresh plaster, e.g. about ⅓ used material to ⅔ fresh material of the composition being used.

Various conventional means have been used to check the accuracy of molds made by the above described methods for making iron castings for tire molds, and they have been found to be accurate and true to a point heretofore only achieved with non-ferrous metals by plaster molding by the method described in U.S. Letters Patent to Morris Bean No. 2,220,703. The bonded sand molds are made, for example, so as to reproduce ⅙ of the circumference of the tire (six such molds being set in a circle to form the mold for the entire ring casting) and it has been possible to make any quantity of such molds to meet the following test:

The finished bonded said mold is fitted into a freshly made ("green") disposable pattern made in the same pattern mold as the one used to make the mold being checked. Any deviation of linear dimension of any section cut through the assembly is .0007" per inch of length or less, and any deviation of surface contour at any point of any section so checked is .005" or less. Those familiar with previous possibilities for accuracy in bonded sand molds will immediately recognize the outstanding advance in the art of casting thus achieved and the great practical importance of this in making practically available castings which could not be made by conventional means in molds of equivalen size and complexity.

When, to the quality of this exceptional accuracy, is added also the quality of fidelity of surface finish and detail, a result is obtained which is unique and of extraordinary practical significance. This is seen to be particularly true when it is realized that the result is obtained by methods which permit a very high degree of reproducibility and control in manufacturing and with materials which are cheap and commonly available and equipment which is standard in most foundries.

*Example 2*

The pattern in this case was made on a pattern mold of "Korogel" (i.e. a resilent elastic gel of vinyl chloride and a plasticizer) by casting therein a slurry composed of 50% second settle plaster (Detroit plaster heated at 200° C. for two hours on shallow trays) and 50% calcined and pulverized plaster composition from used plaster molds or patterns (containing 40 percent of calcium sulfate plaster, 50% Ottawa Bond Sand, and 10% talc), all mixed with water to a consistency of 60.

This plaster slurry poured into the Korogel pattern mold is allowed to set and is then removed and immersed in water for 15 minutes, or for such a length of time as will completely saturate it with water. The pattern is then removed from the water, quickly drained, and immediately dipped in and out of acetone. It is then blown off with air. This method has the advantage of quickly and uniformly drying the mold surface while leaving the mold body completely saturated with water.

The surface of the disposable pattern is then promptly sprayed with a solution of equal parts of acetone and flexible collodion. A little aluminum powder, red iron oxide, or other suitable pigment may be introduced into the spray to lend visibility to the film being applied.

The surface is then sprayed, immediately, with a slurry consisting of that fraction of Albany Bank Sand which will pass through a 50 mesh screen (it is re-screened to extract any miscellaneous coarse particles), 100 parts, BR18478–2 parts, BR18261–1.8 parts, and water to bring the mix to the proper consistency for spraying. It should be pointed out that Albany Bank Sand is very fine, and contains a considerable portion of clay, which lends plasticity to the slurry, and also facilitates the use of the dry and liquid resins in combination. These liquid and dry resins have proven wholly unsatisfactory when mixed together in a conventional core sand, for example, because the two resins tends to combine into small taffy-like lumps about $\frac{1}{32}$" in diameter, which it is not feasible to re-distribute. In the presence of the very fine particles, such as clay, however, a homogeneous mixture of the two resins has been obtained.

The slurry coat is sprayed on to the surface of the disposable pattern to the desired thickness (advantageously .005" to .020" and in any case less than about 0.1" as uniformly as possible. Before the slurry coat has a chance to dry, it is backed up by pouring over it the desired depth or thickness of a coated sand such as described in Example 1, and the whole assembly is vibrated to effect packing of the coated sand.

The disposable pattern, with the sand mold over it, is then ready for the resin curing, pattern disposal, and casting steps, which are carried out as in the preferred example.

This example may be modified in various ways:

Other parting coatings may be used, e.g., the surface of the disposable pattern may be sprayed with a fine suspension of graphite powder in water until the molding surface of the pattern is fully and uniformly covered, and presents a dense, black appearance. This layer is as thin as is consistent with complete and uniform covering of the surface (not over .003"). This is then sprayed with a water solution of green soap which diffuses through the graphite layer and apparently reacts with the calcium at the surface of the mold is produce a calcium soap precipitate which bonds the graphite onto the face of the pattern. Red iron oxide, aluminum paint powder, alumina, and other fine, refractory powders may be used in like manner to form a parting layer, reproduce faithfully the surface of the pattern, and to form the outermost surface layer of the casting mold, since it is held by the resin in the slurry coat when the pattern material is disintegrated and removed.

Other finely divided refractories may be used in the slurry coat, e.g., a good slurry can be made with 10 parts pigment grade red iron oxide, 90 parts silica flour, 4 parts BR18478, 3.6 parts BR18261, and water to bring the slurry to the right consistency.

Other liquid vehicles than water can be used in the slurry coat, though if it is desired to use the dry and liquid resins in combination, one has to be selected which is compatible with the liquids in the liquid resin. In cases where the dry resin is to be used alone (which is most acceptable in small molds or cores which can be baked out very fast) it may be advantageous to use a vaporizable liquid vehicle, such as kerosene or No. 2 diesel oil.

Instead of spraying the slurry coat onto the surface of the disposable pattern, it may be poured over the surface of the pattern, and then poured out. It will thus leave a uniform layer over the pattern surface, the thickness of which can be predetermined by the viscosity of the slurry. The addition of a wetting agent to the slurry, e.g., Tergitol 08, will aid in the distribution of the slurry over the pattern surface when thus applied, and will aid in the elimination of bubbles.

Instead of using a coated sand backup, it may be desirable in some cases to use a more conventional core mix which contains some liquid to give it some stickiness and consequent green strength. The damp backup will be harder to pack uniformly behind the slurry coat, though a small sand slinger has been found to be an aid in this step, but it will have the advantage of requiring less support to hold it in place, and other advantages familiar to experienced foundrymen.

Other modifications of Example 1 may obviously be used in this Example 2.

Using the procedure of Example 2 and using a horsehide softball as the pattern, it was possible to reproduce every visible detail of the surface of the leather, and of the sewing thread, notwithstanding the fact that the casting was made of gray iron cast in the bonded sand mold.

From the foregoing it will be seen that the invention makes possible for formation of accurate and smooth molds of a wide variety of sizes and design of high permeability (for example, exceeding A.F.A. 50) made up of refractory particles and a thermo-setting binder and formed over a one-piece wasteable pattern even though it may have undercuts such that a rigid pattern cannot be withdrawn as such from the mold. This application is a division of my prior copending application Serial No. 199,006, filed December 4, 1950. This application has issued as Patent 2,836,867 granted June 3, 1958.

I claim:

1. A casting mold the walls of which are composed of grains of sand which have been individually pre-coated with dry films of thermosetting resin binder adhering to said grains, the binder on adjacent grains being bonded together and thermoset around the points of contact and the films between said contact points being so thin as to leave substantial open interstices for escape of gases through said mold.

2. A mold having a molding surface of permeability in excess of 10 on the American Foundrymen's Association scale, composed of a refractory flake type pigment exposed at the molding surface and conforming precisely to the desired minute detail of a surface it is desired to mold, and a mold wall supporting said pigment composed of refractory granules substantially contacting one another and said pigment, and being cemented at the points of contact by thin films of an indurated thermo-setting bonding resin coating said granules and merged together at said points.

3. A mold which comprises a layer of refractory granules conforming substantially to a surface which is to be formed by the mold, and individually coated by, and bonded to one another by, films of thermo-setting bonding resin, and refractory pigment lying precisely at said surface bonded adjacent said surface by the resin films on said granules but said pigment not being covered by the resin, whereby the pigment forms a non-adhesive covering over said bonded granules but leaves open spaces for escape of gases from the mold cavity through the resulting mold body.

4. A casting mold according to claim 1 having inserted in the walls thereof and projecting therefrom rigid inserts bonded to said sand.

5. A casting mold according to claim 1 having inserted in said walls thereof and projecting therefrom inserts of austenitic steel bonded to said sand.

References Cited in the file of this patent

UNITED STATES PATENTS

| | | |
|---|---|---|
| 1,073,745 | Durkee | Sept. 23, 1913 |
| 1,948,653 | Emery et al. | Feb. 27, 1934 |
| 2,201,321 | Robie | May 21, 1940 |
| 2,263,001 | Gunsaulus | Nov. 18, 1941 |
| 2,441,695 | Feagin et al. | May 18, 1948 |
| 2,454,819 | Moyer | Nov. 30, 1948 |
| 2,517,815 | Weston | Aug. 8, 1950 |
| 2,706,188 | Fitko et al. | Apr. 12, 1955 |
| 2,730,514 | Wallace et al. | Jan. 10, 1956 |

OTHER REFERENCES

Fiat Final Report, No. 1168—pages 1–6, by Wm. McCulloch.